(12) United States Patent
Soddemann et al.

(10) Patent No.: US 9,371,403 B2
(45) Date of Patent: Jun. 21, 2016

(54) HYDROGENATION OF DIENE-BASED POLYMERS

(75) Inventors: Matthias Soddemann, Schattdorf (CH); Sharon Guo, London (CA); Zhenli Wei, Düsseldorf (DE)

(73) Assignee: LANXESS Deutschland GmbH, Cologne (DE)

( * ) Notice: Subject to any disclaimer, the term of this patent is extended or adjusted under 35 U.S.C. 154(b) by 221 days.

(21) Appl. No.: 13/812,240

(22) PCT Filed: Jul. 27, 2011

(86) PCT No.: PCT/EP2011/062873
§ 371 (c)(1),
(2), (4) Date: Aug. 29, 2013

(87) PCT Pub. No.: WO2012/013697
PCT Pub. Date: Feb. 2, 2012

(65) Prior Publication Data
US 2013/0331524 A1    Dec. 12, 2013

(30) Foreign Application Priority Data
Jul. 28, 2010 (WO) ............... PCT/CN2010/075529

(51) Int. Cl.
*C08C 19/02* (2006.01)
*C08F 8/04* (2006.01)
*C08F 36/06* (2006.01)
*C08G 83/00* (2006.01)

(52) U.S. Cl.
CPC . *C08C 19/02* (2013.01); *C08F 8/04* (2013.01); *C08F 36/06* (2013.01); *C08G 83/002* (2013.01); *C08G 83/003* (2013.01); *C08G 83/005* (2013.01)

(58) Field of Classification Search
None
See application file for complete search history.

(56) References Cited

U.S. PATENT DOCUMENTS

| | | | |
|---|---|---|---|
| 3,700,637 A | 10/1972 | Finch, Jr. et al. | |
| 4,337,329 A | 6/1982 | Kubo et al. | |
| 4,452,951 A * | 6/1984 | Kubo | C08C 19/02 525/329.3 |
| 4,853,441 A | 8/1989 | Buding et al. | |
| 5,169,901 A * | 12/1992 | Takahashi | B01J 31/06 502/159 |
| 5,612,422 A | 3/1997 | Hucul et al. | |
| 7,951,875 B2 | 5/2011 | Guerin et al. | |
| 2002/0055656 A1 * | 5/2002 | Kuhn et al. | 568/318 |
| 2007/0049700 A1 * | 3/2007 | Obrecht et al. | 525/329.1 |
| 2008/0064822 A1 | 3/2008 | Obrecht et al. | |
| 2008/0076881 A1 | 3/2008 | Obrecht et al. | |

FOREIGN PATENT DOCUMENTS

GB    358534    10/1931

OTHER PUBLICATIONS

Tabuani, Macromolecules 2003, 36, 4294-4301.*
Bhattacharjee, Journal of Polymer Science Part A: Polymer Chemistry, vol. 30, Issue 3, p. 471-484 (1992).*
Keilitz, ChemCatChem 2010, vol. 2, p. 863-870.*
Guo et al., "Hydrogenation of five-membered heterocycles of polymer-supported palladium catalyst at normal temperature and pressure", Polym. Adv. Technol. 2004: 15: 100-104, John Wiley & Sons, Ltd.
Bergbreiter et al., "Functionalized Hyberbranched Polyethylene Powder Supports", Organic Letters, American Chemical Society, US, vol. 2, No. 18, Jan. 1, 2000, pp. 2853-2855.
Shirai et al., "Size-selective hydrogenation of NBR polymers catalyzed by pore-size controlled smectites loaded with palladium", Applied Catalysis A: General 177 (1999) pp. 219-225, Elsevier.
Tabuani et al., Palladium Nanoparticles Supported on Hyperbranched Aramids: Syntheses, Characterization, and Some Applications in the Hydrogenation of Unsaturated Substrates:, Macromolecules 2003, 36, pp. 4294-4301, American Chemical Society.
Gao et al., "Hyperbranched polymers: from synthesis to applications", Prog. Polym. Sci. 29 (2004) pp. 183-275, Elsevier.
Sablong et al., "Catalysis with Soluble Hybrids of Highly Branched Macromolecules with Palladium Nanoparticles in a Continuously Operated Membrane Reactor", Adv. Snyth. Catal. 2003, 345, No. 3, pp. 333-336, Wiley-VCH Verlag GmbH & Co., KGaA, Weinheim.
Tuchbreiter et al., "Hydroformylation with Dendritic-Polymer-Stablized Rhodium Colloids as Catalyst Precursors", Macromol. Chem. Phys. 2007, 208, pp. 1688-1693, Wiley-VCH Verlag GmbH & Co.,KGaA, Weinheim.
Jikei et al., Synthesis of Hyperbranched Aromatic Polyamide from Aromatic Diamines and Trimesic Acid:, Communications to the Editor, Macromolecules, 1999, 32, pp. 2061-2064, American Chemical Society.
Monticelli et al., "Hyperbranched Aramids by the A2 + B3 versus AB2 Approach: Influence of the REaction Conditions of Structural Development", High Performance Polymers, pp. S45-S59, 2001 SAGE Publications.
International Search Report from International Application PCT/EP2011/062873 dated Jun. 27, 2013, 3 pages.

* cited by examiner

*Primary Examiner* — Robert C Boyle (57) ABSTRACT

This invention relates to a process for the hydrogenation of diene-based copolymers in the presence of catalysts on specific carrier materials containing at least one hyper-branched polymer.

24 Claims, 1 Drawing Sheet

Figure 1 HB polymer support pPDT

Figure 2 pPDT loaded with Pd(OAc)₂

Figure 3 Pd/pPDT catalyst after H₂ reduction

HYDROGENATION OF DIENE-BASED POLYMERS

FIELD OF THE INVENTION

This invention relates to a process for the hydrogenation of diene based copolymers in the presence of catalysts supported on specific carrier materials.

BACKGROUND OF THE INVENTION

Processes for preparing nitrile rubbers by emulsion polymerization of (meth)acrylonitrile with conjugated dienes, for example butadiene, and optionally, small amounts of other comonomers are widely known, for example, from DE 658 172. One type of such other co-monomers are α,β-unsaturated carboxylic acids and the resulting terpolymers are often abbreviated as "XNBR". In addition, it is known from U.S. Pat. No. 3,700,637 that nitrile rubbers of this type can be hydrogenated, preferably using homogeneous rhodium halide complex catalysts. The strength of the products thus obtained is substantially improved by comparison with the strength of non-hydrogenated starting products.

It is further known that catalysts based on a metal of Group VIII of the periodic table supported on a porous carrier such as carbon, silica or alumina can be used to catalyse hydrogenation of the carbon-carbon double bonds of conjugated diene polymers. In U.S. Pat. No. 4,337,329 it is e.g. disclosed that the hydrogenation of acrylonitrile/butadiene copolymers can be achieved by using palladium in combination with another metal precipitated together on a porous powdery or granular carrier such as silica, silica-alumina, alumina, diatomaceous earth, or activated carbon. It is described that the polymer may be hydrogenated as such, however, that good results are in particular obtained if the polymer is used in the form of a solution.

In U.S. Pat. No. 4,452,951 the hydrogenation of acrylonitrile/butadiene copolymers using a hydrogenation catalyst supported on silicon dioxide having a specific surface area of not more than 600 m$^2$/g and an average pore diameter of from 80 to 1,000 Å is described.

In U.S. Pat. No. 4,853,441 the hydrogenation of acrylonitrile/butadiene copolymers was carried out using Pd supported on a non porous alkaline earth metal carbonate carrier, preferably on CaCO$_3$.

In Applied Catalysis A: General 177 (1999) 219-225 it is disclosed to use palladium supported on mesopore size-controlled smectites for hydrogenation of butadiene-acrylonitrile copolymers in carbon tetrachloride.

In U.S. Pat. No. 5,612,422 the hydrogenation of high molecular weight polystyrene in the presence of silica supported Rh or Pt containing catalysts was reported.

The carrier materials proposed so far for the heterogeneous hydrogenation catalysts used for hydrogenating diene based polymers often suffer from having low mechanical strength which in consequence results in the disadvantage, that they cannot be successfully used several times, since, owing to the mechanical stress a fine grain portion occurs, which either renders the hydrogenation product impure or results in a working-up step substantially more difficult.

It is furtheron known from Macromolecules 36 (2003), 4294-4301 (Orietta Monticelli et al.) to use palladium nanoparticles supported on so called hyper-branched aromatic polyamides (aramids) for the hydrogenation of small molecules, i.e. unsaturated organic chemicals (benzene, benzylideneacetone, phenylacetylene, diphenylacetylene and quinoline). It was found that the NH$_2$ groups of the HB aromatic polyamides bond Pd(II) ions. Hyper-branched polymers ("HB polymers" for short) are highly branched macromolecules with a three-dimensional architecture which pursuant to Prog. Polym. Sci. 29 (2004) 183-275 belong to the class of dendritic polymers. Over the past 15 years, HB polymers have attracted increasing attention owing to their interesting properties and greater availability as compared with other types of dendrimers. In Prog. Polym. Sci. 29 (2004) 183-275 it is described that HB polymers have potential applications in coatings, as additives, for drug and gene delivery, as macromolecular building blocks, for nanotechnology and supramolecular science. However, only few published reports and patents exist relating to catalysts supported on HB polymers: In Adv. Synth. Catal., 345 (2003), 333 (Mecking et al.) it is described to use hybrids of palladium nanoparticles with highly branched amphiphilic polyglycerol as a catalyst for the hydrogenation of cyclohexene. The reaction was performed in a continuously operated membrane reactor and the reaction mixture was continuously drawn from the reactor via the membrane. In Macromol. Chem. Phys. 208 (2007), 1688 (Mecking et al.) it is further described that hydroformylation of 1-hexene may be performed with rhodium colloids stabilized by poly(ethylene imine)amides with a hyper-branched polyamine core and a lipophilic periphery.

The object of the present invention was to provide a new and improved hydrogenation process using a heterogeneous catalyst allowing the selective hydrogenation of a diene-based polymer with a high degree of hydrogenation within short reaction times at low reaction pressures and mild temperatures. It was a further object to find a catalyst disposing of sufficient mechanical strength which may be easily recovered and often re-used in such hydrogenation of diene-based polymers.

SUMMARY OF THE INVENTION

The present invention provides a process for hydrogenating carbon-carbon double bonds in a polymer containing repeating units based on dienes which process comprises subjecting such polymer to hydrogenation in the presence of a group VIIIb metal containing catalyst supported on a carrier material comprising at least one hyper-branched polymer.

DETAILED DESCRIPTION OF THE INVENTION

The process of the present invention allows a selective hydrogenation of the carbon-carbon double bonds which are present in repeating units of polymers based on diene monomers. This means that, for example, the double bonds in aromatic or naphthenic groups are not hydrogenated and double or triple bonds between carbon and hetero atoms such as nitrogen or oxygen and in particular nitrile groups are also not affected.

The feature of using a group VIIIb metal containing catalyst supported on a hyper-branched polymer is important for the successful performance of the process pursuant to the present invention in order to obtain a very high degree of hydrogenation at a reaction pressure and temperature being substantially lower than known from prior art for other processes. Furtheron the rate of hydrogenation is high and the crosslinking problem occurring in other processes known from prior art is overcome.

Although the use of noble metals supported on polymers including hyper-branched polymers as catalysts for hydrogenation reaction of small olefin or small aromatic molecules in solution has already been described in the prior art, none of the available literature regarding hydrogenation of diene based polymers disclosed or taught the use of any polymeric material as catalyst support for polymer hydrogenation. An artisan would have most likely expected problems in such hydrogenation due to the substantially higher viscosity of polymer solutions to be hydrogenated. Surprisingly no such problems have been recognized. The use of the group VIIIb metal containing catalyst supported on a carrier material comprising at least one hyper branched polymer enhances and facilitates the inventive process substantially. It allows the simple removal of the catalyst from the hydrogenated polymer by mere filtration. Surprisingly the catalyst can be recycled and reused various times without any refreshment which increases the viability of the process and in particular the commercial attractiveness substantially.

Polymer to be Hydrogenated:

The polymer to be hydrogenated by the process pursuant to the present invention comprises repeating units of at least one diene, preferably at least one conjugated diene.

The conjugated diene can be of any nature. In one embodiment $(C_4-C_6)$ conjugated dienes are used. Preference is given to 1,3-butadiene, isoprene, 1-methylbutadiene, 2,3-dimethylbutadiene, piperylene, chloroprene, or mixtures thereof. Particular preference is given to 1,3-butadiene and isoprene or mixtures thereof. Especial preference is given to 1,3-butadiene.

In a further embodiment of the present process diene-based polymers having carbon-carbon double bonds can be used which comprise repeating units of not only at least one conjugated diene as monomer (a), but additionally of at least one further copolymerizable monomer (b), preferably of two further copolymerizable monomers (b).

Examples of suitable monomers (b) are olefins, such as ethylene or propylene. Further examples of suitable monomers (b) are vinylaromatic monomers, such as styrene, o-, m- or p-methyl styrene, vinylnaphthalene, vinylpyridine, o-chlorostyrene or vinyltoluenes, vinylesters of aliphatic or branched $C_1-C_{18}$ monocarboxylic acids, such as vinyl acetate, vinyl propionate, vinyl butyrate, vinyl valerate, vinyl hexanoate, vinyl 2-ethylhexanoate, vinyl decanoate, vinyl laurate and vinyl stearate.

One preferred polymer to be hydrogenated in the present process is a copolymer of 1,3-butadiene and styrene or alpha-methylstyrene. Said copolymers may have a random or block type structure.

Suitable other copolymerizable monomers (b) are α,β-unsaturated nitriles. It is possible to use any known α,β-unsaturated nitrile, preferably a $(C_3-C_5)$ α,β-unsaturated nitrile such as acrylonitrile, methacrylonitrile, ethacrylonitrile or mixtures thereof. Particular preference is given to acrylonitrile.

One further preferred polymer to be used in the present invention is a copolymer having repeating units of at least one conjugated diene and at least one α,β-unsaturated nitrile which are also abbreviated "nitrile rubbers" or "NBR" for short. Even more preferably a copolymer having repeating units based on 1,3-butadiene and acrylonitrile can be hydrogenated according to the novel process.

As further copolymerizable monomers (b) it is possible to make use, for example, of fluorine-containing vinylmonomers, preferably fluoroethyl vinyl ether, fluoropropyl vinyl ether, o-fluoromethylstyrene, vinyl pentafluorobenzoate, difluoroethylene and tetrafluoroethylene, or else copolymerizable anti-ageing monomers, preferably N-(4-anilinophenyl) acrylamide, N-(4-anilinophenyl)methacrylamide, N-(4-anilinophenyl)cinnamides, N-(4-anilinophenyl) crotonamide, N-phenyl-4-(3-vinylbenzyloxy)aniline and N-phenyl-4-(4-vinylbenzyloxy)aniline, and also non-conjugated dienes, such as 4-cyanocyclohexene and 4-vinylcyclohexene, or else alkynes, such as 1- or 2-butyne.

Alternatively, as further copolymerizable termonomers, it is possible to use copolymerizable termonomers containing carboxyl groups, examples being α,β-unsaturated monocarboxylic acids, their esters, their amides, α,β-unsaturated dicarboxylic acids, their monoesters, their diesters, or their corresponding anhydrides and amides.

More preferably a nitrile rubber is used as diene-based polymer which comprises repeating units based on at least one conjugated diene, more preferably $(C_4-C_6)$ conjugated dienes, even more preferably selected from the group consisting of 1,3-butadiene, isoprene, 1-methylbutadiene, 2,3-dimethylbutadiene, piperylene, chloroprene, and mixtures thereof, at least one α,β-unsaturated nitriles, more preferably a $(C_3-C_5)$ α,β-unsaturated nitrile, even more preferably selected from the group consisting of acrylonitrile, methacrylonitrile, ethacrylonitrile and mixtures thereof; and optionally one or more further copolymerizable monomers, preferably selected from the group consisting of α,β-unsaturated monocarboxylic acids, their esters, their amides, α,β-unsaturated dicarboxylic acids, their monoesters, their diesters, their corresponding anhydrides and amides.

As α,β-unsaturated monocarboxylic acids it is possible with preference to use acrylic acid and methacrylic acid.

It is also possible to use esters of the α,β-unsaturated monocarboxylic acids, preferably their alkyl esters and alkoxyalkyl esters. Preference is given to the alkyl esters, especially $C_1-C_{18}$ alkyl esters, of the α,β-unsaturated monocarboxylic acids, Particular preference is given to alkyl esters, especially $C_1-C_{18}$ alkyl esters, of acrylic acid or of methacrylic acid, more particularly methyl acrylate, ethyl acrylate, propyl acrylate, n-butyl acrylate, tert-butyl acrylate, 2-ethylhexyl acrylate, n-dodecyl acrylate, methyl methacrylate, ethyl methacrylate, butyl methacrylate and 2-ethylhexyl methacrylate. Also preferred are alkoxyalkyl esters of the α,β-unsaturated monocarboxylic acids, more preferably alkoxyalkyl esters of acrylic acid or of methacrylic acid, more particular $C_2-C_{12}$ alkoxyalkyl esters of acrylic acid or of methacrylic acid, very preferably methoxymethyl acrylate, methoxyethyl (meth)acrylate, ethoxyethyl (meth)acrylate and methoxyethyl (meth)acrylate. Use may also be made of mixtures of alkyl esters, such as those mentioned above, for example, with alkoxyalkyl esters, in the form of those mentioned above, for example. Use may also be made of cyanoalkyl acrylate and cyanoalkyl methacrylates in which the C atom number of the cyanoalkyl group is 2-12, preferably α-cyanoethyl acrylate, β-cyanoethyl acrylate and cyanobutyl methacrylate. Use may also be made of hydroxyalkyl acrylates and hydroxyalkyl methacrylate in which the C atom number of the hydroxyalkyl groups is 1-12, preferably 2-hydroxyethyl acrylate, 2-hydroxyethyl methacrylate and 3-hydroxypropyl acrylate; use may also be made of fluorine-substituted benzyl-group-containing acrylates or methacrylates, preferably fluorobenzyl acrylate, and fluorobenzyl methacrylate. Use may also be made of acrylates and methacrylates containing fluoroalkyl groups, preferably trifluoroethyl acrylate and tetrafluoropropyl methacrylate. Use may also be made of α,β-unsaturated carboxylic esters containing amino groups, such as dimethylaminomethyl acrylate and diethylaminoethyl acrylate.

As other copolymerizable monomers it is possible, furthermore, to use α,β-unsaturated dicarboxylic acids, preferably maleic acid, fumaric acid, crotonic acid, itaconic acid, citraconic acid and mesaconic acid.

Use may be made, furthermore, of a, 3-unsaturated dicarboxylic anhydrides, preferably maleic anhydride, itaconic anhydride, citraconic anhydride and rnesaconic anhydride.

It is possible, furthermore, to use monoesters or diesters of α,β-unsaturated dicarboxylic acids.

These α,β-unsaturated dicarboxylic monoesters or diesters may be, for example, alkyl esters, preferably $C_1$-$C_{10}$ alkyl, more particularly ethyl, n-propyl, isopropyl, n-butyl, tert-butyl, n-pentyl or n-hexyl esters, alkoxyalkyl esters, preferably $C_2$-$C_{12}$ alkoxyalkyl, more preferably $C_3$-$C_8$-alkoxyalkyl, hydroxyalkyl, preferably $C_1$-$C_{12}$ hydroxyalkyl, more preferably $C_2$-$C_8$ hydroxyalkyl, cycloalkyl esters, preferably $C_5$-$C_{12}$ cycloalkyl, more preferably $C_6$-$C_{12}$ cycloalkyl, alkylcycloalkyl esters, preferably $C_6$-$C_{12}$ alkylcycloalkyl, more preferably $C_7$-$C_{10}$ alkylcycloalkyl, aryl esters, preferably $C_6$-$C_{14}$ aryl esters, these esters being monoesters or diesters, and it also being possible, in the case of the diesters, for the esters to be mixed esters.

Particularly preferred alkyl esters of α,β-unsaturated monocarboxylic acids are methyl (meth)acrylate, ethyl (meth)acrylate, propyl (meth)acrylate, n-butyl (meth)acrylate, t-butyl (meth)acrylate, hexyl (meth)acrylate, 2-ethylhexyl (meth)acrylate, octyl (meth)acrylate, 2-propylheptyl acrylate and lauryl (meth)acrylate. More particularly, n-butyl acrylate is used.

Particularly preferred alkoxyalkyl esters of the α,β-unsaturated monocarboxylic acids are methoxyethyl (meth)acrylate, ethoxyethyl (meth)acrylate and methoxyethyl (meth)acrylate. More particularly, methoxyethyl acrylate is used.

Particularly preferred hydroxyalkyl esters of the α,β-unsaturated monocarboxylic acids are hydroxyethyl (meth)acrylate, hydroxypropyl (meth)acrylate and hydroxybutyl (meth)acrylate.

Other esters of the α,β-unsaturated monocarboxylic acids that are used are additionally, for example, polyethylene glycol (meth)acrylate, polypropylene glycol (meth)acrylate, glycidyl (meth)acrylate, epoxy (meth)acrylate, N-(2-hydroxyethyl)acrylamides, N-(2-hydroxymethyl)acrylamides and urethane (meth)acrylate.

Examples of α,β-unsaturated dicarboxylic monoesters encompass
  maleic acid monoalkyl esters, preferably monomethyl maleate, monoethyl maleate, monopropyl maleate and mono-n-butyl maleate;
  maleic acid monocycloalkyl esters, preferably monocyclopentyl maleate, monocyclohexyl maleate and monocycloheptyl maleate;
  maleic acid monoalkyl cycloalkyl esters, preferably monomethyl cyclopentyl maleate and monoethyl cyclohexyl maleate;
  maleic acid monoaryl esters, preferably monophenyl maleate;
  maleic acid monobenzyl esters, preferably monobenzyl maleate;
  fumaric acid monoalkyl esters, preferably monomethyl fumarate, monoethyl fumarate, monopropyl fumarate and mono-n-butyl fumarate;
  fumaric acid monocycloalkyl esters, preferably monocyclopentyl fumarate, monocyclohexyl fumarate and monocycloheptyl fumarate;
  fumaric acid monoalkyl cycloalkyl esters, preferably monomethyl cyclopentyl fumarate and monoethyl cyclohexyl fumarate;
  fumaric acid monoaryl esters, preferably monophenyl fumarate;
  fumaric acid monobenzyl esters, preferably monobenzyl fumarate;
  citraconic acid monoalkyl esters, preferably monomethyl citraconate, monoethyl citraconate, monopropyl citraconate and mono-n-butyl citraconate;
  citraconic acid monocycloalkyl esters, preferably monocyclopentyl citraconate, monocyclohexyl citraconate and monocycloheptyl citraconate;
  citraconic acid monoalkyl cycloalkyl esters, preferably monomethyl cyclopentyl citraconate and monoethyl cyclohexyl citraconate;
  citraconic acid monoaryl esters, preferably monophenyl citraconate;
  citraconic acid monobenzyl esters, preferably monobenzyl citraconate;
  itaconic acid monoalkyl esters, preferably monomethyl itaconate, monoethyl itaconate, monopropyl itaconate and mono-n-butyl itaconate;
  itaconic acid monocycloalkyl esters, preferably monocyclopentyl itaconate, monocyclohexyl itaconate and monocycloheptyl itaconate;
  itaconic acid monoalkyl cycloalkyl esters, preferably monomethyl cyclopentyl itaconate and monoethyl cyclohexyl itaconate;
  itaconic acid monoaryl esters, preferably monophenyl itaconate;
  itaconic acid monobenzyl esters, preferably monobenzyl itaconate.
  Mesaconic acid monoalkyl esters, preferably mesaconic acid monoethyl esters;

As α,β-unsaturated dicarboxylic diesters it is possible to use the analogous diesters based on the abovementioned monoester groups, and the ester groups may also be chemically different groups.

In one embodiment of the present process a copolymer having repeating units of at least one conjugated diene, at least one α,β-unsaturated nitriles and one or more further copolymerisable monomers is subjected to hydrogenation.

Proportion of Comonomers:

With regard to one of the preferably used polymers, i.e. NBR, the proportions of conjugated diene(s) and α,β-unsaturated nitrile(s) in the NBR polymers may vary within wide ranges. The proportion of or the sum of the conjugated dienes is typically in the range from 40 to 90% preferably in the range from 50 to 85%, by weight, based on the overall polymer. The proportion of or the sum of the α,β-unsaturated nitriles is typically 10 to 60%, preferably 15 to 50%, by weight, based on the overall polymer. The proportions of the monomers add up in each case to 100% by weight. The additional monomers, depending on the nature of the termonomer(s), may be present in amounts of 0% to 40% by weight, based on the overall polymer. In this case, corresponding proportions of the conjugated diene or dienes and/or of the α,β-unsaturated nitrile or nitriles are replaced by the proportions of the additional monomers, with the proportions of all the monomers adding up in each case to 100% by weight.

Mooney Viscosity and Molecular Weights of the Nitrile Rubbers to be Hydrogenated and the Hydrogenated Nitrile Rubbers Obtained:

In one embodiment of the present invention nitrile rubbers may be hydrogenated which typically have a Mooney viscosity (ML (1+4) at 100° C.) in the range of from 5 to 140, preferably 5 to 130, more preferably 10 to 100, even more preferably 20 to 100, and particularly preferred from 25 to 100. The weight average molecular weight $M_w$ lies in the range of from 5,000-500,000, preferably in the range of from 20,000-500,000, more preferably in the range 25,000-400,000. The nitrile rubbers to be hydrogenated typically have a polydispersity $PDI=M_w/M_n$, where $M_w$ is the weight average molecular weight and $M_n$ is the number average molecular weight, in the range of from 1.5 to 6.0, preferably of from 1.8 to 6.0, more preferably of from 1.9 to 6.0 and even more preferably in the range of from 2.0 to 4.0. The determination of the Mooney viscosity is carried out in accordance with ASTM standard D 1646.

The hydrogenated nitrile rubbers obtained after hydrogenating the aforementioned nitrile rubbers typically have a Mooney viscosity (ML (1+4) at 100° C.) in the range of from 5 to 200, preferably 5 to 160, more preferably 5 to 140, even more preferably 20 to 140, and particularly preferred from 25 to 140. The weight average molecular weight $M_w$ lies in the range of from 30,000 to 400,000, preferably in the range of from 30,000 to 350,000, more preferably in the range of from 35,000 to 300,000. The hydrogenated nitrile rubbers typically have a polydispersity $PDI=M_w/M_n$, where $M_w$ is the weight average molecular weight and $M_n$ is the number average molecular weight, in the range of from 1.5 to 6.0, preferably of from 1.8 to 6.0, more preferably of from 1.9 to 6.0 and even more preferably in the range of from 2.0 to 4.0.

In one preferred embodiment of the present invention nitrile rubbers may be hydrogenated which have a very low viscosity: Such nitrile rubber have a weight average molecular weight $M_w$ of 60,000 g/mol or less, preferably 5,000 to 55,000 gm/mol, more preferably 10,000 to 50,000 g/mol, more preferably 12,000 to 50,000 g/mol and a polydispersity (Mw/Mn) of at maximum 2.5, preferably at maximum 2.4, more preferably at maximum 2.3, even more preferably at maximum 2.2 and most preferably at maximum 2.0.

The hydrogenated nitrile rubbers obtained after hydrogenating the aforementioned nitrile rubbers with very low viscosity typically have a viscosity of at maximum 20,000 Pa*s measured at 100° C. and a shear rate of 1/s, preferably at maximum 10,000 Pa*s, more preferably at maximum 5,000 Pa*s and most preferably at maximum 1,000 Pa*s. The weight average molecular weight $M_w$ of such hydrogenated nitrile rubbers typically amounts to at maximum 60,000 g/mol, preferably 10,000 to 50,000 g/mol, more preferably 12,000 to 50,000 g/mol and a polydispersity (Mw/Mn) of at maximum 2.5, preferably at maximum 2.4, more preferably at maximum 2.3, even more preferably at maximum 2.2 and most preferably at maximum 2.0.

The preparation of nitrile rubbers by polymerization of the abovementioned monomers is adequately known to those skilled in the art and is comprehensively described in the polymer literature. Mostly the polymerization is performed in emulsion: However, a solution based polymerization is also possible, as disclosed in a recent European patent application not yet published. It is also possible to subject such nitrile rubbers (prior to hydrogenation) to a metathesis reaction in the presence of a metal complex-metathesis catalyst in order to decrease the molecular weight and viscosity thereof. Such cross-metathesis reaction which can optionally be performed in the additional presence of a low molecular weight olefin (the so called "co-olefin") is widely known in the art and subject of numerous patents and patent applications like e.g. WO-A-2002/100941 or WO-A-2002/100905.

Nitrile rubbers which can be used for the purposes of the invention are also commercially available, e.g. as products from the product range of the trade names Perbunan® and Krynac® from Lanxess Deutschland GmbH.

Proportions in Other Diene-Based Polymers:

If a polymer other than a nitrile rubber is used in the present process which contains repeating units of one or more dienes, preferably conjugated dienes, and one or more other copolymerizable monomers as defined above, like e.g. styrene or o-methylstyrene, the proportion of the dienes, preferably conjugated diene(s) is usually from 15 to less than 100% b.w. and the proportion of or of the sum of the copolymerizable monomer(s) is from greater than 0 to 85% b.w. with the proportion of all monomers in each case adding up to 100%. If styrene or o-methyl styrene are used as copolymerizable monomers besides one or more conjugated dienes, the proportion of styrene and/or o-methyl styrene is preferably from 15 to 60% b.w., while the remainder to 100% b.w. is represented by the conjugated diene(s).

The carbon-carbon double bonds containing polymer (other than NBR) to be used in the present invention may be prepared by any method known to those skilled in the art, such as emulsion polymerization, solution polymerization or bulk polymerization. Preferably, the carbon-carbon double bond containing polymer useful in the present invention is prepared in an aqueous emulsion polymerization process.

Definition of Supported Hydrogenation Catalyst:

The hydrogenation catalyst to be used in the process of the present invention is a Group VIIIb metal containing catalyst supported on a carrier material comprising at least one hyperbranched polymer.

In the context of this invention "Group VIIIb metal" means a metal of Group VIIIb of the Periodic Table of Elements.

Suitable metals of Group VIIIb of the Periodic Table of Elements are Ru, Rh, Pd, Fe, Co, Ni, Os, Ir, and Pt. Preferably a Palladium containing catalyst deposited on a carrier material comprising at least one hyper-branched polymer is used for the hydrogenation.

Hyper-branched polymers ("HB polymers" for short) are highly branched macromolecules with a three-dimensional architecture and pursuant to Prog. Polym. Sci. 29 (2004) 183-275 they belong to the class of dendritic polymers.

Hyperbranched polymers are typically synthesized pursuant to the following two major methods also described in detail in Prog. Polym. Sci. 29 (2004) 183-275:

1) the so-called single-monomer methodology ("SMM") in which the hyper-branched polymers are synthesized by polymerization of (i) at least one monomer bearing one functional group A and n functional groups B (so called "$AB_n$ monomer"), wherein n is an integer and at least 2, B may be identical or different functional groups and the functional group A is capable of reacting with functional groups B, or (ii) a latent $AB_n$ monomer adhering to the same definition as outlined under (i) and releasing the $AB_n$ monomer in-situ under polymerisation conditions; and 2) the so-called double-monomer methodology ("DMM") in which the hyper-branched polymers are synthesized by direct polymerization of at least one monomer with two functional groups A and at least one monomer with at least three functional groups B, wherein the groups A can be identical or different and the functional groups B can be identical or different and functional groups A are capable of reacting with functional groups B.

As described in Prog. Polym. Sci. 29 (2004) 183-275 single monomer methodology includes at least four specific approaches: (1) polycondensation of $AB_n$ monomers; (2) self-condensing vinyl polymerisation ("SCVP"); (3) self-condensing ring-opening polymerization ("SCROP") and (4) proton-transfer polymerization ("PTP").

Polycondensation of $AB_n$ monomers (1), in particular $AB_2$ monomers allows the synthesis of HB polyphenylenes, polyethers, polyesters, polyamides, polycarbonates and pol(etherketone)s. In the alternative through polyaddition of $AB_n$ monomers HB polyurethanes, polycarbosilanes, polymides and poly(acetophenone)s may also be obtained. SCROP (3) allows the synthesis of HB polyamines, polyethers, and polyesters. PTP (4) allows the synthesis of HB polyesters with epoxy or hydroxyl end groups as well as HB polysiloxanes.

The following hyper-branched polymers can be favourably used in the process according to the invention: Hyper-branched aliphatic and aromatic polyamides, polyethyleneimines, functionalized polyethyleneimines, polyureas, polyols, polyglycidoles, polyethers, polythiols, polythioethers.

In one embodiment the hyper-branched polymer used as carrier material represents a hyper-branched aliphatic or aromatic polyamide. Such hyper-branched aliphatic or aromatic polyamides can be obtained by SMM as well as DMM. With regard to DMM hyper-branched aliphatic or aromatic polyamides can be obtained by polycondensation of difunctional monomers ("$A_2$" for short) with monomers being trifunctional or higher than trifunctional ("$B_3$" for short). In one embodiment the hyper-branched aliphatic or aromatic polyamide can be prepared by polycondensation of an aliphatic or aromatic diamine ("$A_2$") with an acid having at least three carboxyl groups ("$B_3$" for short) or in the alternative by polycondensation of a dicarboxylic acid ("$A_2$") with an amine having at least three amino groups ("$B_3$").

The principle method of preparing HB aromatic polyamides using the $A_2+B_3$ approach was reported in Macromolecules, 1999, 32, 2061 (Mitsutoshi Jikei et al.). In High Perform. Polym. 13 (2001) 45-S59 (Orietta Monticelli et al.) the influence of polymerization conditions on the HB polymer structure was investigated.

Preferred hyper-branched aromatic polyamides can be synthesized by polycondensation of p-phenylenediamine (for short "PD" as $A_2$ monomer) and/or 4,4'-oxyphenylene diamine (for short "ODA" as $A_2$ monomer) and trimesic acid (for short "TMA" as $B_3$ monomer). The resulting hyper-branched aromatic polyamides are hereinafter denoted as "pPDT" for short and possess the principle structure as hereinafter shown schematically for PD as diamine. Such pPDT can be successfully used as the polymeric carrier to produce active Pd-containing pPDT supported catalysts, which can hydrogenate NBR to high conversion and can be easily recycled for reuse.

Scheme 1 Synthesis and structure of the hyper-branched ($A_2 + B_3$) pPDT

Scheme 1(a) shows the same polycondensation in some more detail with regard to the resulting HB pPDT.

↑

+

The advantage of such DMM method to prepare HB aromatic polyamides is the use of commercially available reactants for the easy preparation thereof. To obtain the HB pPDT with suitable structure for synthesizing the Pd/pPDT catalyst, it is advisable to optimize polymerization conditions (temperature, reagent amount and concentrations, ratio of functional groups in the reaction system, reaction time, etc). It is also recommendable to adequately handle the HB pPDT during the finishing process and the metal salt loading process. It is recommendable to prepare HP pPDT bearing excess terminal $NH_2$ functional groups The performance of the hydrogenation can be optimized by influencing the pore size of the hyper-branched polymer used as catalyst support: It is recommendable to use HB polymer particles with pore sizes larger than the size of tangled NBR molecules present in the solution to be hydrogenated.

Apart from the polycondensation according to the $A_2+B_3$ approach it is also possible to perform a self-polycondensation of an $AB_2$-type monomer to obtain HB aromatic polyamides: Self-polycondensation of 5-(4-aminobenzamido) isophthalic acid ("ABZAIA") as $AB_2$-type monomer results in the hyper-branched aromatic polyamide structure principally shown in Scheme 2 (for short "HB pABZAIA Aramid").

Scheme 2: Synthesis and structure of the HB pABZAIA Aramid as schematically shown in Scheme 3 which are obtainable by 1) adding four molecules of methylacrylate to ethylene diamine, 2) amidation of the terminal carboxymethyl groups with excess ethylene diamine and 3) repeating the addition of methylacrylate and amidation with excess ethylene diamine various times to prepare the hyper-branched structure.

Scheme 3: HB PAMAM

Other examples of suitable HB polymers are polyethylenimine, functionalized polyethylenimines and polyureas with principle structures as shown in Scheme 4(a) to (c). HB Polyethyleneimines are obtainable by cationic ring-opening polymerisation of aziridine or cationic polymerisation of ethyleneimine, HB functionized polyethyleneimines are typically obtainable by converting HB polyethyleneimines with desired functionalizing agents as e.g. carboxylic acids (see Scheme 4(b) with hexane carboxylic acid as functionalizing agent). HP Polyureas are obtainable by polyaddition of isocyanates with amines according to the $A_2+B_3$ approach by either using diisocyanates and triamines or diamines with triisocyanates.

Scheme 4(a): HB polyethylenimine

In a further embodiment the hyper-branched polymer used as carrier material represents a hyper-branched aliphatic polyamide like poly(amido amine) (for short "HB PAMAM")

Scheme 4(b): HB functionalized polyethyleneimine

Scheme 4(c): Polyureas

Other examples of suitable HB polymers are HB polyesters like e.g. polyglyceroles which are obtainable by polycondensation of glycerol and carboxylic acids with at least two carboxy groups per molecule like e.g. phthalic acid. In the alternative glycerol may be polycondensed with the respective carboxylic acid anhydrides which in-situ form carboxylic acids with two carboxy groups like e.g. phthalic anhydride.

The following $A_2$ and $B_3$ monomer pairs may be used in the DMM synthesis of HB polymers viable to be used in the process according to the present invention:

| $A_2$ monomers | $B_3$ monomers |
|---|---|
| H₂N-C₆H₄-NH₂ | benzene-1,3,5-tricarboxylic acid (HOOC, COOH, COOH) |

-continued

| A₂ monomers | B₃ monomers |
|---|---|
|  | |

The following monomers may be used either in the SMM process in case of $AB_n$ monomers or in the DMM process using appropriate monomer pairs to prepare HB polymers viable to be used in the process according to the present invention.

The preparation of the supported catalyst is typically performed in a three step procedure comprising (i) the synthesis of the carrier material as outlined above, (ii) the loading of the Group VIIIb metal (either in the elemental state or in form of a Group VIIIb metal compound) on said carrier material resulting in an impregnated group VIIIb metal containing compound and (iii) in case the loading under (ii) is not performed with the group VIIIb metal in the elemental state the reduction of such impregnated group VIIIb metal containing compound.

A Synthesis of the Carrier Material

The reaction conditions for preparing hyper-branched polymers can be taken from literature. The synthesis of hyper-branched polyamides e.g. starting from aromatic diamines and an acid having at least three carboxyl groups like e.g. trimesic acid is described in Applied Catalysis, A: General, 1999, 177(2), 219 (Shirai, et al.).

B Group VIIIb Metal Loading Process on the Carrier Material

The metals of Group VIIIb of the Periodic Table of Elements can be deposited on the carrier by any ordinary supporting method. For example, these metals can be deposited in the elemental state on the carrier. In another preferred embodiment the carrier may be contacted with a solution of a halide, oxide, hydroxide, acid chloride, sulfate, or carbonate of such metals. Depending on the type of metal compound used either an organic solvent or water may be employed to dissolve the metal compound. In one preferred embodiment Palladium is used as Group VIIIb metal. A broad variety of palladium compounds may then be used for impregnation e.g. salts, complex salts or complexes, such as $PdCl_2$, $Pd(OAc)_2$, palladium fluoride, palladium hydroxide, palladium nitrate, palladium sulfate, palladium oxide, dichlorocyclooctadiene-palladium, dichloronorbornadiene-palladium, tetrakisacetonitrilepalladium tetrafluoroborate, tetrakisbenzonitrilepalladium ditetrafluoroborate, dichlorobisacetonitrilepalladium, dichlorobisethylene-diaminepalladium, bisacetylacetonato-palladium, tristriphenhylphosphine-acetonitrilepalladium tetrafluoroborate, dichlorobistriethylphosphinepalladium, dichlorobis-(dimethyl sulfideValladium, dibenzoylsulfide-palladium, bis(2,2'-dipyridine)palladium perchlorate, and tetrakis-(pyridine)palladium dichloride.

In case the hyper-branched polymer is not impregnated with the metal in the elemental state but with a metal compound as outlined above in solution the impregnated group VIIIb metal containing compound is then subsequently subjected to a reduction to provide the desired catalyst

C Catalyst Activation by Reduction of the Impregnated Group VIIIb Metal Containing Compound After the impregnation process the group VIIIb metal containing compound must be activated if the loading has not been performed with the group VIIIb metal in the elemental state. Such catalyst activation is typically achieved by a reduction which can be performed according to three different methods. The first two methods comprise a reduction prior to performing the hydrogenation, i.e. prior to any contact with the diene-based polymer to be hydrogenated either by using hydrogen or a viable reduction agent other than hydrogen, like e.g. $NaBH_4$. The third method comprises the reduction in-situ when performing the hydrogenation.

In case a Pd-containing metal catalyst supported on a carrier material comprising a HB pPDT is used the catalyst activation may be performed as follows:

1. Reduction by $H_2$ in advance—the Pd-containing/pPDT catalysts is mixed with an adequate amount of an organic solvent, preferably acetone, under adequate temperature and pressure. Temperature may typically vary in the range of from 20 to 150° C., pressure is typically chosen in the range of from 0.1 MPa to 20 MPa; after reduction, the catalyst is typically collected by filtration and then used for hydrogenation;
2. Reduction by $NaBH_4$ in advance—the Pd-containing/pPDT catalyst is mixed into an aqueous solution of $NaBH_4$ under adequate temperature and pressure. Temperature may typically vary in the range of from 20 to 100° C.; the concentration of the aqueous solution of $NaBH_4$ may typically vary in the range of from 0.01 M to 10 M; after reduction, the particles may be washed to efficiently remove the excess of the reducing agent and dried at adequate temperatures, optionally under reduced pressure, and then can be used for hydrogenation;
3. Reduction—the Pd/pPDT catalyst is added into the solution of the diene-based polymer to be hydrogenated and then $H_2$ is introduced at hydrogenation temperature; this resulting in an in-situ reduction of the pPDT supported Pd salt.

The reduction time can be chosen by any artisan in a range of from several minutes to hours depending on the pressure and temperature.

The amount of Group VIIIb metal deposited on the carrier material comprising at least one hyper-branched polymer is usually 0.001 to 30% by weight (calculated as metal, i.e. after activation), preferably 0.05 to 10% by weight, more preferably 0.1 to 5% by weight based on 100% of the carrier material.

If the amount of Group VIIIb metal is too small, i.e. smaller than the above mentioned lowest value, the supported catalyst must be used in a great quantity in the reaction. Consequently, the viscosity of the reaction system might become too high, so that is difficult to stir. Hence, the catalyst might not be effectively used. On the other hand, if the amount of Group VIIIb metal supported on the carrier material is too large, i.e. larger than the above mentioned highest value, dispersion of the metals on the carrier might become poor, and the diameter of the metal particles increases to reduce the catalytic activity of the resulting catalyst.

The weight ratio of the weight ratio of the Group VIIIb metal containing catalyst deposited on the carrier material comprising at least one hyper-branched polymer (calculated as Group VIIIb metal) to the diene-based polymer is in the range of from 0.002 to 0.5, preferably 0.004 to 0.2; more preferably 0.07 to 0.15 and most preferably of 0.01 to 0.1.

Description of Hydrogenation Reaction:

The process of the present invention is generally carried out at a temperature in the range of from 0° C. to 150° C., preferably in the range of from 5° C. to 100° C., more preferably in the range of from 10° C. to 90° C., even more preferably in the range of from 15° C. to 70° C. and in particular in the range of from 20° C. to 60° C. This means that the process may be carried out at mild conditions.

The hydrogenation process of the present invention is preferably carried out with hydrogen gas at a pressure of from 0.1 to 20 MPa, preferably of from 0.25 to 16 MPa, and more preferably of from 1 to 12 MPa. In one embodiment of the present process said hydrogen gas is essentially pure.

Typically the hydrogenation temperature in the range of from 0° C. to 150° C., preferably in the range of from 5° C. to 100° C., more preferably in the range of from 10° C. to 90° C., even more preferably in the range of from 15° C. to 70° C. and in particular in the range of from 20° C. to 60° C. and the hydrogenation pressure is in the range of from 0.1 to 20 MPa, preferably of from 0.25 to 16 MPa, and more preferably of from 1 to 12 MPa. In one embodiment of the present process said hydrogen gas is essentially pure.

Solvents:

The present process is typically performed in an organic solvent. Such organic solvent shall be inert under the reaction conditions of the reduction and/or hydrogenation and should not disadvantageously influence the catalyst. Suitable solvents encompass ketones, such as acetone, methyl ethyl ketone, methyl isopropyl ketone, diisopropyl ketone, 2- or 3-pentanone, cyclohexanone, preferably acetone and methyl ethyl ketone, ethers, such as tetrahydrofuran, dioxan, anisole or ethylene glycol monomethyl ether, preferably tetrahydrofuran and anisole, and aromatic hydrocarbons, such as benzene, toluene or xylene.

Both the unsaturated diene based polymer as well as the partially or completely hydrogenated polymer should be soluble in the solvent used.

Concentration of Diene-Based Polymer in the Reaction Mixture:

In a typical embodiment the concentration of the diene-based polymer, preferably the NBR, in the reaction mixture is up 25% by weight, preferably up to 20% by weight, more preferably up to 18% by weight and most preferably up to 15% by weight based on the reaction mixture.

In a typical embodiment of the present process the solution of the diene based polymer is contacted with the Group VIII metal containing catalyst deposited on a carrier material containing at least one hyper-branched polymer. A suited reactor can be charged with the needed amount of the Group VIIIb metal containing catalyst supported on at least one hyper-branched polymer and the desired amount of diene based polymer dissolved in an organic solvent. Then the reactor is sealed and the reaction system assembled for the hydrogenation. The reaction mixture is then typically purged by bubbling nitrogen gas.

After that the reaction system is heated to the desired reaction temperature, preferably under stirring with high speed agitation. Then hydrogen gas is introduced into the reaction until the designed pressure is reached. Hydrogenation pressure and reaction temperature are mostly maintained constant throughout the reaction period. After the required reaction time, the reactor is cooled down, the hydrogen pressure released, and the solution containing the hydrogenated polymer together with the heterogeneous catalyst poured out into a flask.

The catalyst can be easily and completely removed from the hydrogenation mixture by simple filtration, recovered and used for further hydrogenation steps again. One relevant feature for this easy and complete removal is the high mechanical strength of the catalyst.

The polymer can be isolated from the remaining reaction mixture by typical methods well-known to the artisan.

Degree of Hydrogenation:

The degree of hydrogenation (percentage of the hydrogenated C=C double bonds based on the total number or original C=C double bonds present in the polymer) may be up to 100%. The hydrogenation may, however, be terminated earlier. Polymers having degrees of hydrogenation of at least 80%, preferably at least 85%, more preferably at least 90%, even more preferably at least 95% and most preferably at least 98% are obtained according to the present process. Typically FT-IR analysis is performed to measure such degree of hydrogenation using ASTM method (D 5670-95).

The hydrogenation may be performed with reaction times in the range of 0.5 to 10 hours. It is surprising that even when choosing very short reaction times in the range of from 0.5 to 2 hours hydrogenation degrees of more than 98% may be performed depending the other hydrogenation parameters chosen.

EXAMPLES

If not indicated otherwise the chemicals used in the subsequent examples are commercially available. In the Examples the following terms and abbreviations shall have the following meanings:

| Room temperature | means 22° C. +/− 2° C. |
| HB | means hyperbranched |
| NMP | means N-methylpyrrolidinone |
| PD | means p-phenylene diamine |
| TMA | means trimesic acid |

A Synthesis of ITB Aromatic Polyamide from p-Phenylene Diamine and Trimesic Acid The synthesis was performed in accordance with the procedure described in Applied Catalysis, A: General, 1999, 177(2), 219.

A 250 mL three-necked flask was charged with 7.5 mL of pyridine and 80 mL of NMP at room temperature, and then 1.08 g (10 mmol) of PD and 2.10 g (10 mmol) of TMA were added into the solvent medium; after PD and TMA were totally dissolved, 7.82 mL (30 mmol) of triphenyl phosphate was added to the solution, and then the mixture was heated to 80° C. for one and half hour followed by pouring the hot solution into 500 mL of methanol containing 10 mL of 12 N aqueous HCl. The precipitated product was collected by filtration.

The wet pPDT material was then washed three times using fresh methanol and subsequently collected by filtration again followed by drying at room temperature under atmospheric pressure for 12 hours.

B Preparation of Pd Catalysts Supported on the HB pPDT (Pd/pPDT Catalysts)

The obtained pPDT polymer particles were stirred in a solution (an aqueous solution or an organic solvent) containing a Pd metal salt at room temperature for 48 hours.

When $Pda_2$ was used as the metal salt, the solution was an aqueous solution of acetic acid ($H_2O$/acetic acid=9/1 (v/v)) containing $PdCl_2$ (0.01 wt %) and the HB polymer/$PdCl_2$ ratio was 10/1 (w/w); when palladium(II) acetate ($Pd(OAc)_2$) was used as the metal salt, the solution was acetone and the HB polymer/$Pd(OAc)_2$ ratio was 10/1 (w/w).

During the process, a change in color of both polymer and solution occurred. After 48 hours of agitation at room temperature, the particles were filtered, washed several times with water (when $PdCl_2$ was used) or acetone (when palladium acetate was used) until the washed $H_2O$ or acetone is clear without color. The obtained wet (Pd salt)/pPDT was then dried in vacuum at 60° C. for 12 hours or was dried under atmospheric pressure at room temperature for 24 hours. There were still some solvent residues in the final catalyst from this process.

Before using the Pd/pPDT for hydrogenation experiments, a Mettler HR83 moisture analyzer was used to heat a sample of the catalyst to 150° C. and hold for 5 minutes to check the weight loss, and then the solid content of the catalyst was calculated based on this measurement. After this solid content measurement, the samples of the prepared Pd/pPDT catalysts were analyzed by inductively coupled plasma atomic emission spectroscopy (ICP) in order to determine the Pd metal content of the dried Pd/pPDT. The measured Pd metal content can be seen in different tables in later parts of this report.

After the impregnation process, three different catalyst activation methods were used for different batches of Pd/pPDT catalysts:

1. Reduction by $NaBH_4$ in advance—Pd/pPDT catalyst was mixed into an aqueous solution of $NaBH_4$ (0.1M) at 50° C. for 2 hours; after the reduction, the particles were washed extensively to remove the excess of the reducing agent and dried at 60° C. under vacuum for 24 hours before being used for hydrogenation;

2. Reduction by $H_2$ in advance—the Pd/pPDT catalysts was mixed with 200 ml acetone in the Parr reactor under 500 psi of $H_2$ pressure for 2 hours at 60° C.; after the reaction, the particles were collected by filtration and then used for hydrogenation;
3. Reduction in-situ—the Pd/pPDT catalyst was added into the NBR solution and then $H_2$ was introduced at NBR hydrogenation temperature; in this method, the pPDT supported Pd salt was reduced in-situ for the hydrogenation of NBR.

C Characterization of the Pd/pPDT Catalyst

Figure 1:
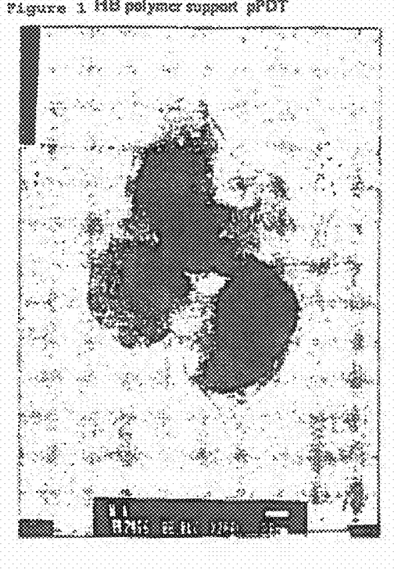
FIG. 1 shows a transmission electron microscope image of a hyper-branched pPDT support material.
Figure 2:
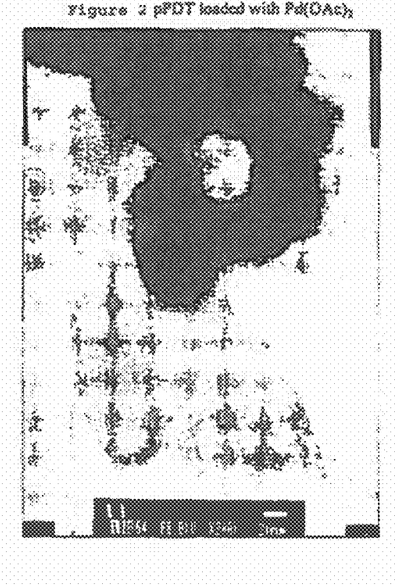
FIG. 2 shows a transmission electron microscope image of a hyper-branched pPDT support material loaded with Pb(OAc)$_2$.
Figure 3:
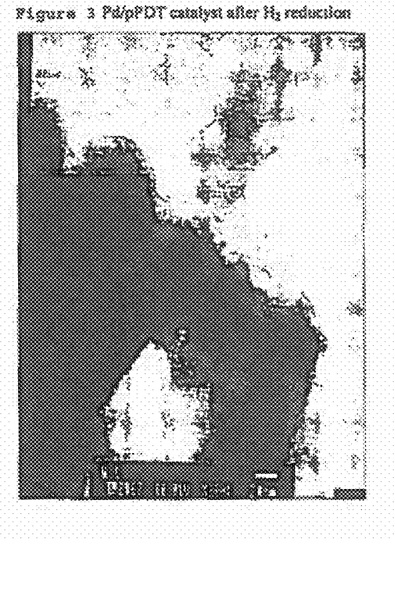
FIG. 3 shows a transmission electron microscope image of a Pd/pPDT catalyst after H$_2$ reduction.

The FIGS. 1-3 show transmission electron microscope images of pPBT material according to embodiments, wherein:

FIG. 1 shows a TEM image of hyper-branched polymer support, i.e. the pPDT material, prior to further processing according to an embodiment;

FIG. 2 shows a TEM image of the pPDT material after loading of the pPDT material with $Pd(OAc)_2$; and FIG. 3 shows a TEM image of the Pd/pPDT catalyst after $H_2$ reduction of the Pb loaded pPDT material.

TEM measurements were performed with a Philips high resolution transmission electron microscope. The polymer/Pd powders were suspended in 2-propanol and a drop of the resultant mixture was deposited on a carbon grid at room temperature. The obtained TEM micrographs show the view of 200K amplifications. All Pd metallic particles found in the TEM pictures have a diameter less than 10 nm.

The pPDT material itself was found to be soluble in NMP, DMSO and DMF, and not dissolvable in methanol, ethanol, acetone, MEK, MCB, THF, $CHCl_3$ or $CCl_4$. After loading with $PdCl_2$ or $Pd(OAc)_2$, the Pd/pPDT was no longer soluble in any of the above solvents. This is due to gel formation promoted by the supported Pd metal.

D Hydrogenation Reactions with Pd/pPDT Catalysts

Krynac® 3345F, available from Lanxess Deutschland GmbH, was the NBR grade used for all hydrogenation experiments having an acrylonitrile content of 33% b.w. and a Mooney viscosity (ML (1+4) at 100° C.) of 45.

All reactions were performed in a stainless steel 600 mL Parr reactor equipped with a temperature controller and a paddle stirrer.

As a general procedure, the 600 mL reactor was charged with certain amount of the supported Pd/pPDT catalyst and the desired amount of NBR dissolved in acetone solution; then the reactor was sealed and the reaction system was assembled for the hydrogenation. The NBR solution with catalyst was purged by bubbling nitrogen gas for 20 minutes at room temperature. After that the system was heated to the desired reaction temperature with high speed agitation speed, and then hydrogen gas was introduced into the reaction until designed pressure was reached. Hydrogenation pressure and reaction temperature were maintained constant throughout the reaction period.

After the required reaction time, the reactor was cooled down, the hydrogen pressure was released, and then the polymer solution with the catalyst was poured out into a flask. The catalyst was easily removed from the hydrogenation mixture by simple filtration. The recovered catalyst could be used for hydrogenation again.

FT-IR analysis was carried out to measure the degree of hydrogenation using ASTM method (D 5670-95).

D1 Examples 1 to 7

Table 1 shows the results achieved in hydrogenation experiments 1 to 7 with Pd/pPDT catalysts. In all Examples 1 to 7 $Pd(OAc)_2$ was used to impregnate the pPDT and the reduction of the palladium (II) was performed in-situ when hydrogenating NBR with $H_2$.

TABLE 1

Examples 1 to 7; Hydrogenation of NBR with Pd/pPDT catalysts

| | #1 | #2 | #3 | #4 | #5 | #6 | #7 |
|---|---|---|---|---|---|---|---|
| Amount of catalyst powder used | 0.60 g | 0.76 g | 0.74 g | 0.71 g | 0.68 g | 0.67 g | 0.65 g |
| Solid content of the catalyst powder | 83% | 66% | 68% | 71% | 75% | 75% | 76% |
| Pd metal/catalyst solid | 2.80 wt % | 3.49 wt % | 3.56 wt % | 4.00 wt % | 4.00 wt % | 4.00 wt % | 4.00 wt % |
| Concentration of NBR solution | 1 g NBR/ 100 mL acetone | 1 g NBR/ 100 mL acetone | 1 g NBR/ 100 mL acetone | 1 g NBR/ 100 mL acetone | 1 g NBR/ 100 mL acetone | 1 g NBR/ 100 mL acetone | 1 g NBR/ 100 mL acetone |
| Pd metal/NBR (w/w) | 1.39 wt % | 1.75 wt % | 1.79 wt % | 2 wt % | 2 wt % | 2 wt % | 2 wt % |
| Hydrogen pressure | 3.45 MPa (500 psi) | 3.45 MPa (500 psi) | 3.45 MPa (500 psi) | 3.45 MPa (500 psi) | 3.45 MPa (500 psi) | 3.45 MPa (500 psi) | 0.35 MPa (50 psi) |
| Temperature | 60° C. | 60° C. | 60° C. | 60° C. | 60° C. | 25° C. | 60° C. |
| Time | 3 hours | 2 hours | 3 hours | 1 hours | 0.5 hours | 4 hours | 4 hours |
| Reduction of —CN group | None | None | None | None | None | None | None |
| Conversion | 90% | 94% | 97% | 99% | 98% | 78% | 80% |

Table 1 clearly shows that NBR can be selectively hydrogenated using the Pd/pPDT catalysts. At high Pd metal/NBR ratio (2 wt %), the conversion could reach 98% within half an hour at 60° C. under 3.45 MPa (500 psi) of hydrogen pressure, while it took longer reaction time to reach high conversion when the temperature was down to 25° C. or the hydrogen pressure was lowered to 0.35 MPa (50 psi).

D2 Examples 8 and 9

Recycle and Reuse of the Pd/pPDT Catalyst

Examples 8 and 9 prove the recyclability of the supported catalysts. After the first hydrogenation of NBR in Example 8 and 9, respectively, the Pd/pPDT catalyst was separated by simple filtration followed by extensive washing using acetone. The recycled Pd/pPDT catalyst was then reused for a new hydrogenation reaction. The hydrogenation results using fresh and recycled Pd/pPDT catalysts are summarized in Table 2.

TABLE 2

Recycle and reuse of Pd/pPDT catalysts (3.45 MPa of $H_2$, 60° C., 3 hours)

|  | #8(1)<br>1st use<br>Fresh<br>catalyst | #8(2)<br>2nd use<br>Catalyst<br>reused | #8(3)<br>3rd use<br>Cat. reuse | #8(4)<br>4th use<br>Cat. reuse | #9(1)<br>1st use<br>Fresh cat. | #9(2)<br>2nd use<br>Cat. reuse |
|---|---|---|---|---|---|---|
| Pd status<br>before HD | $Pd(OAc)_2$/<br>pPDT | Pd(0)/<br>pPDT | Pd(0)/<br>pPDT | Pd(0)/<br>pPDT | $PdCl_2$/<br>pPDT | Pd(0)/<br>pPDT |
| Pd Reduction<br>method | in-situ with<br>NBR by $H_2$ | Already<br>reduced | Already<br>reduced | Already<br>reduced | in-situ<br>with NBR<br>by $H_2$ | Already<br>reduced |
| Amount of<br>catalyst powder<br>used | 4 g | Reuse<br>the catalyst<br>from #8(1) | Reuse<br>the catalyst<br>from #8(2) | Reuse<br>the catalyst<br>from #8(3) | 2 g | Reuse<br>the catalyst<br>from #9(1) |
| Solid content of<br>the catalyst<br>powder | 50% |  |  |  | 70% |  |
| Pd metal/<br>catalyst solid | 4.60 wt % | 4.14 wt %* | Not tested | 2.48 wt %* | 2.78 wt % | 1.5 wt %* |
| Concentration<br>of NBR solution | 1 g NBR/<br>100 mL<br>acetone | 1 g NBR/<br>100 mL<br>acetone | 1 g NBR/<br>100 mL<br>acetone | 1 g NBR/<br>100 mL<br>acetone | 1 g NBR/<br>100 mL<br>acetone | 1 g NBR/<br>100 mL<br>acetone |
| Pd metal/NBR<br>(w/w) | 0.092 | n/a | n/a | n/a | 0.056 | n/a |
| Conversion | 98% | 98% | 93% | 85% | 94% | 92% |

*after the previous hydrogenation run, a sample of the recycled catalyst was dried to measure the Pd metal content of the recycled catalyst by ICP The results of Table 2 clearly show that the Pd/pPDT catalyst can be recycled and directly reused for sequent NBR hydrogenation runs without re-activation or re-conditioning process. The Pd metal content of the Pd/pPDT catalyst decreased after reuse, probably due to the leakage of Pd metal into NBR solution during hydrogenation, however the hydrogenation results are still very good.

D3 Examples 10-13

Effect of Pd/NBR Ratio on the NBR Hydrogenation

Examples 10 to 13 using Pd/pPDT catalysts show the influence of the Pd/NBR ratio on the hydrogenation. In all Examples 10 to 13 $Pd(OAc)_2$ was used to impregnate the pPDT and the reduction of the palladium (II) was performed in-situ when hydrogenating NBR with $H_2$. The results are summarized in Table 3.

TABLE 3

Effect of Pd/NBR ratio on NBR hydrogenation

|  | #10 | #11 | #12 | #13 |
|---|---|---|---|---|
| Amount of<br>catalyst powder<br>used | 1.37 g | 0.65 g | 0.158 g | 0.074 g |
| Solid content<br>of the catalyst<br>powder | 73% | 76% | 79% | 84% |

TABLE 3-continued

Effect of Pd/NBR ratio on NBR hydrogenation

|  | #10 | #11 | #12 | #13 |
|---|---|---|---|---|
| Pd metal<br>content/catalyst<br>solid | 3.3 wt % | 3.3 wt % | 3.3 wt % | 3.3 wt % |
| Concentration<br>of NBR<br>solution | 1 g NBR/100<br>mL acetone | 1 g NBR/100<br>mL acetone | 1 g NBR/100<br>mL acetone | 1 g NBR/100<br>mL acetone |
| Pd metal/NBR<br>(w/w) | 0.033 | 0.016 | 0.004 | 0.002 |
| Hydrogen<br>pressure | 3.45 MPa<br>(500 psi) | 3.45 MPa<br>(500 psi) | 5.2 MPa<br>(800 psi) | 5.2 MPa<br>(800 psi) |
| Temperature | 60° C. | 60° C. | 60° C. | 60° C. |
| Time | 3 hours | 3 hours | 3 hours | 4 hours |
| Conversion | 97% | 98% | 86% | 26% |

The above results clearly show that a hydrogenation conversion of >85% can still be achieved when the Pd/NBR weight ratio was very low with 0.004 this proving the broad applicability of the process according to the invention.

D4 Examples 14-18

Hydrogenation of NBR Solutions with High Solid Content Using Pd/pPDT Catalyst

In Examples 14 to 18 solutions with higher solid contents (up to 18 wt %) were used for the hydrogenation of NBR. The results are shown in Table 4.

TABLE 4

Hydrogenation of high solid content NBR solutions (60° C.)

|  | #14 | #15 | #16 | #17 | #18 |
|---|---|---|---|---|---|
| NBR solution | 15 g NBR/100 mL<br>acetone<br>(18 wt %) | 12 g NBR/100 mL<br>acetone<br>(15 wt %) | 12 g NBR/100 mL<br>acetone<br>(15 wt %) | 12 g NBR/100 mL<br>acetone<br>(15 wt %) | 12 g NBR/100 mL<br>acetone<br>(15 wt %) |

TABLE 4-continued

Hydrogenation of high solid content NBR solutions (60° C.)

| | #14 | #15 | #16 | #17 | #18 |
|---|---|---|---|---|---|
| Pd Reduction method | in-situ with NBR by $H_2$ | in-situ with NBR by $H_2$ | in-situ with NBR by $H_2$ | $Pd(OAc)_2$/pPDT was reduced by $H_2$ in advance | $Pd(OAc)_2$/pPDT was reduced by $H_2$ in advance |
| Pd status before start of the NBR hydrogenation | $Pd(OAc)_2$/ pPDT | $Pd(OAc)_2$/ pPDT | $Pd(OAc)_2$/ pPDT | Pd(0)/pPDT | Pd(0)/pPDT |
| Amount of catalyst powder used | 0.65 g | 3.68 g | 5.60 g | 6.08 g | 6.40 g |
| Solid content of the catalyst powder | 77% | 81% | 72% | 66% | 63% |
| Pd metal content/ catalyst solid | 4.00 wt % | 2.79 wt % | 3.56 wt % | 3.49 wt % | 3.51 wt % |
| Pd metal/NBR (w/w) | 0.0013 | 0.0070 | 0.0119 | 0.0117 | 0.0118 |
| Hydrogen pressure | 3.45 MPa (500 psi) | 10.34 MPa (1500 psi) | 10.34 MPa (1500 psi) | 10.34 MPa (1500 psi) | 6.78 MPa (1000 psi) |
| Time | 4 hours | 7 hours | 7 hours | 6 hours | 4 hours |
| Conversion | No HD | 56% | 62% | 91% | 94% |

The results of Table 4 indicate that it took a longer time to hydrogenate NBR solutions with higher solid content to high conversion when the Pd/pPDT catalyst was activated in-situ with NBR solution by $H_2$. When the Pd/pPDT catalyst was reduced by $H_2$ in advance and then mixed with NBR solution, the hydrogenation reached higher conversion within shorter time.

The invention claimed is:

1. A process for selectively hydrogenating carbon-carbon double bonds in a diene-based polymer, the process comprising selectively hydrogenating carbon-carbon double bonds of a diene-based polymer in the presence of a group VIIIb metal containing catalyst supported on a carrier material comprising at least one hyper-branched polymer, at a temperature of 20° C. to 60° C. and in a solvent selected from the group consisting of ketones, ethers and aromatic hydrocarbons.

2. The process according to claim 1, wherein:
the diene-based polymer comprises repeating units of at least one conjugated diene; and
the selective hydrogenation comprises hydrogenation of only carbon-carbon double bonds of the diene-based polymers, wherein double bonds in aromatic or naphthenic groups which may be present, and double or triple bonds between carbon and hetero atoms which may be present, are not hydrogenated.

3. The process according to claim 2, wherein the diene-based polymer additionally comprises repeating units of at least one further copolymerizable monomer.

4. The process according to claim 3, wherein;
the further copolymerizable monomer comprises α,β-unsaturated nitriles;
the ketones are selected from the group consisting of acetone, methyl ethyl ketone, methyl isopropyl ketone, diisopropyl ketone, 2- and 3-pentanone, cyclohexanone;
the ethers are selected from the group consisting of tetrahydrofuran, dioxan, anisole and ethylene glycol monomethyl ether; and
the aromatic hydrocarbons are selected from the group consisting of benzene, toluene or xylene.

5. The process according to claim 1, wherein the diene-based polymer comprises a nitrile rubber comprising repeating units of at least one conjugated diene, at least one α,β-unsaturated nitrile and optionally one or more further copolymerizable termonomers.

6. The process according to claim 5, wherein the nitrile rubber has a Mooney viscosity (ML (1+4) at 100° C.) of 5 to 140, a weight average molecular weight $M_w$ of 5,000-500,000, and a polydispersity $PDI=M_w/M_n$, where $M_w$ is the weight average molecular weight and $M_n$ is the number average molecular weight, of 1.5 to 6.0.

7. The process according to claim 5, wherein:
the nitrile rubber has a weight average molecular weight $M_w$ of 60,000 g/mol or less, and a polydispersity (Mw/Mn) of at maximum 2.5; and
the solvent is at least one of acetone, methyl ethyl ketone, tetrahydrofuran, anisole, benzene, toluene and xylene.

8. The process according to claim 1, wherein the group VIIIb metal is selected from the group consisting of Ru, Rh, Pd, Fe, Co, Ni, Os, Ir, and Pt.

9. The process according to claim 1 or 8, further comprising producing the hyperbranched polymers by either:
1) the single-monomer methodology ("SMM") in which the hyper-branched polymers are synthesized by polymerization of (i) at least one monomer bearing one functional group A and n functional groups B ("$AB_n$ monomer"), wherein n is an integer and at least 2, the functional groups B may be identical or different functional groups, and the functional group A is capable of reacting with the functional groups B, or (ii) a latent $AB_n$ monomer adhering to the same definition as outlined under (i) which releases the $AB_n$ monomer in-situ under polymerization conditions; or
2) the double-monomer methodology ("DMM") in which the hyper-branched polymers are synthesized by direct polymerization of at least one monomer with two functional groups A and at least one monomer with at least three functional groups B, wherein the groups A can be identical or different, and the functional groups B can be identical or different, and functional groups A are capable of reacting with functional groups B.

10. The process according to claim 1, wherein the hyperbranched polymer is selected from the group consisting of aliphatic polyamides, aromatic polyamides, polyethyleneimines, functionalized polyethyleneimines, polyureas, polyols, polyglycidoles, polyethers, polythiols, and polythioethers.

11. The process according to claim 1, wherein the carrier material comprises:
 (i) a hyper-branched poly(amido amine) ("HB PAMAM") obtained by 1) adding four molecules of methylacrylate to ethylene diamine, 2) amidation of the terminal carboxymethyl groups with excess ethylene diamine, and 3) repeating the addition of methylacrylate and amidation with excess ethylene diamine various times, or
 (ii) a hyper-branched aromatic polyamide "HB-pPDT" obtained by polycondensation of p-phenylenediamine and/or 4,4'-oxyphenylene diamine with trimesic acid, or
 (iii) a hyper-branched aromatic polyamide "HB-PABA-ZAIA" obtained by self-polycondensation of 5-(4-aminobenzamido)isophthalic acid, or
 (iv) hyper-branched polyglyceroles obtained by polycondensation of glycerol with carboxylic acids bearing at least two carboxy groups per molecule, or with the respective carboxylic acid anhydride which in-situ forms a carboxylic acid with two carboxy groups, or
 (v) a hyper-branched polyethyleneimine ("HB PEI") obtained by cationic ring-opening polymerisation of aziridine or by cationic polymerisation of ethyleneimine, or
 (vi) a hyper-branched functionalized polyethyleneimine obtained by converting HB PEI with at least one functionalizing agent, or
 (vii) a hyper-branched polyurea obtained by polyaddition of isocyanates with amines.

12. The process according to claim 9, wherein the group VIIIb metal containing catalyst supported on a carrier material comprising at least one hyper-branched polymer is obtained by
 (i) synthesizing the carrier material pursuant to claim 9,
 (ii) loading of the Group VIIIb metal either in an elemental state or in a form of a Group VIIIb metal compound onto said carrier material resulting in an impregnated group VIIIb metal containing compound, and
 (iii) in case the loading under (ii) is not performed with the group VIIIb metal in the elemental state, reducing the impregnated group VIIIb metal containing compound.

13. The process according to claim 1, wherein the amount of Group VIIIb metal in the group VIIIb metal containing catalyst supported on the carrier material comprising at least one hyper-branched polymer is 0.001 to 30% by weight (calculated as metal) based on 100% of the carrier material.

14. The process according to claim 1, wherein the weight ratio of the catalyst (calculated as Group VIIIb metal) to the diene-based polymer is 0.002 to 0.5.

15. The process according to claim 1, wherein:
 the concentration of the diene-based polymer in the reaction mixture is up to 25% by weight based on the reaction mixture; and
 the hydrogenation is conducted with hydrogen gas at a pressure of 0.1 MPa to 20 MPa.

16. The process according to claim 3, wherein the further copolymerizable monomer comprises ($C_3$-$C_5$) α,β-unsaturated nitriles.

17. The process according to claim 3, wherein the further copolymerizable monomer comprises acrylonitrile, methacrylonitrile, ethacrylonitrile, or mixtures thereof.

18. The process according to claim 5, wherein the diene-based polymer comprises a nitrile rubber comprising repeating units of at least one conjugated diene, at least one α,β-unsaturated nitrile, and one or more further copolymerizable termonomers.

19. The process according to claim 18, wherein the one or more further copolymerizable monomers are selected from the group consisting of α,β-unsaturated monocarboxylic acids, their esters or amides, α,β-unsaturated dicarboxylic acids, their monoesters or diesters, or their corresponding anhydrides or amides.

20. The process according to claim 5, wherein the nitrile rubber has a Mooney viscosity (ML (1+4) at 100° C.) of 10 to 100, a weight average molecular weight $M_w$ of 25,000-400,000 g/mol, and a polydispersity PDI=$M_w/M_n$, of 1.9 to 6.0.

21. The process according to claim 5, wherein the nitrile rubber has a Mooney viscosity (ML (1+4) at 100° C.) of 10 to 100, a weight average molecular weight $M_w$ of 5,000 to 55,000 g/mol, and a polydispersity (Mw/Mn) of at most 2.4.

22. The process according to claim 5, wherein the nitrile rubber has a Mooney viscosity (ML (1+4) at 100° C.) of 10 to 100, a weight average molecular weight $M_w$ of 10,000 to 50,000 g/mol, and a polydispersity (Mw/Mn) of at most 2.3.

23. The process according to claim 1, wherein;
 the group VIIIb metal is palladium; and
 the selective hydrogenation comprises hydrogenation of only carbon-carbon double bonds of the polymers wherein double bonds in aromatic or naphthenic groups, and double or triple bonds between carbon and hetero atoms are not hydrogenated.

24. The process according to claim 1, wherein:
 the hydrogenation is conducted with hydrogen gas at a pressure of 1 MPa to 12 MPa;
 the group VIIIb metal is palladium;
 the amount of palladium in the catalyst (calculated as metal) is 0.1 to 5% by weight, based on 100% of the carrier material;
 the weight ratio of the catalyst (calculated as Group VIIIb metal) to the diene-based polymer is 0.01 to 0.1;
 the diene-based polymer comprises repeating units of: at least one conjugated diene selected from the group consisting of 1,3-butadiene, isoprene, 1-methylbutadiene, 2,3-dimethylbutadiene, piperylene, chloroprene, or mixtures thereof; α,β-unsaturated nitriles selected from the group consisting of acrylonitrile, methacrylonitrile, ethacrylonitrile or mixtures thereof; and one or more further copolymerizable termonomers selected from the group consisting of α,β-unsaturated monocarboxylic acids, their esters or amides, α,β-unsaturated dicarboxylic acids, their monoesters or diesters, or their corresponding anhydrides or amides;
 the concentration of the diene-based polymer in the reaction mixture is up to 15% by weight based on the reaction mixture;
 the nitrile rubber has a Mooney viscosity (ML (1+4) at 100° C.) of 25 to 100, a weight average molecular weight $M_w$ of 25,000-50,000, and a polydispersity PDI=$M_w/M_n$, of from 2.0 to 4.0; and
 the carrier material comprises:
 (i) a hyper-branched poly(amido amine) ("HB PAMAM") obtained by 1) adding four molecules of methylacrylate to ethylene diamine, 2) amidation of the terminal carboxymethyl groups with excess ethylene diamine, and 3) repeating the addition of methylacrylate and amidation with excess ethylene diamine various times, or
 (ii) a hyper-branched aromatic polyamide "HB-pPDT" obtained by polycondensation of p-phenylenediamine and/or 4,4'-oxyphenylene diamine with trimesic acid, or
 (iii) a hyper-branched aromatic polyamide "HB-PABA-ZAIA" obtained by self-polycondensation of 5-(4-aminobenzamido)isophthalic acid, or
 (iv) hyper-branched polyglyceroles obtained by polycondensation of glycerol with phthalic acid, or with phthalic anhydride, or (v) a hyper-branched polyethyleneimine ("HB PEI") obtained by cationic ring-opening polymerisation of aziridine or by cationic polymerisation of ethyleneimine, or
(vi) a hyper-branched functionalized polyethyleneimine obtained by converting HB PEI with at least one functionalizing agent selected from carboxylic acids or carboxylic acid derivatives, or
(vii) a hyper-branched polyurea obtained by polyaddition of diisocyanates and triamines, or diamines with triisocyanates.

* * * * *